United States Patent
Tabet et al.

(10) Patent No.: US 10,736,087 B2
(45) Date of Patent: Aug. 4, 2020

(54) SECONDARY COMPONENT CARRIER FUTURE SCHEDULING IN LTE CARRIER AGGREGATION

(71) Applicant: Apple Inc., Cupertino, CA (US)

(72) Inventors: Tarik Tabet, San Jose, CA (US); Vinay Majjigi, Mountain View, CA (US); Christian W. Mucke, Sunnyvale, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/214,516

(22) Filed: Mar. 14, 2014

(65) Prior Publication Data

US 2014/0313993 A1    Oct. 23, 2014

Related U.S. Application Data

(60) Provisional application No. 61/799,967, filed on Mar. 15, 2013.

(51) Int. Cl.
*H04W 72/04* (2009.01)
*H04L 5/00* (2006.01)

(52) U.S. Cl.
CPC ........... *H04W 72/042* (2013.01); *H04L 5/001* (2013.01); *H04L 5/0098* (2013.01)

(58) Field of Classification Search
None
See application file for complete search history.

(56) References Cited

U.S. PATENT DOCUMENTS

| 2010/0118720 A1* | 5/2010 | Gauvreau | H04W 72/048 370/252 |
| 2011/0002262 A1* | 1/2011 | Wang et al. | 370/328 |
| 2011/0002281 A1* | 1/2011 | Terry | H04W 52/0216 370/329 |

(Continued)

FOREIGN PATENT DOCUMENTS

| EP | 2323304 A2 | 5/2011 |
| EP | 2383927 A1 | 11/2011 |

(Continued)

OTHER PUBLICATIONS

Carrier Aggregation for LTE-Advanced: Functionality and Performance Aspects, K.I. Pedersen, et al., IEEE Communications Magazine, vol. 49, Issue: 6, pp. 89-85, Jun. 2011.

(Continued)

*Primary Examiner* — Anh Vu H Ly
*Assistant Examiner* — Hector Reyes
(74) *Attorney, Agent, or Firm* — Kowert, Hood, Munyon, Rankin & Goetzel, P.C.

(57) ABSTRACT

A wireless communication system is presented for future scheduling of secondary component carrier(s) (SCC) during carrier aggregation in LTE wireless communications. A primary component carrier in a first subframe can be used to indicate at what future subframe SCC data may exist for the mobile device (e.g., UE, etc.). The UE can then leave off all SCC receive circuitry until the future subframe, when it can turn on all needed SCC receive circuitry to receive the SCC data. After receiving the SCC data, the UE can again power off the SCC receive circuitry.

17 Claims, 12 Drawing Sheets

(56) References Cited

U.S. PATENT DOCUMENTS

| | | | |
|---|---|---|---|
| 2011/0116467 A1 | 5/2011 | Jung et al. | |
| 2011/0134774 A1* | 6/2011 | Pelletier | H04W 52/365 370/252 |
| 2011/0170420 A1* | 7/2011 | Xi et al. | 370/241 |
| 2011/0267957 A1* | 11/2011 | Du | H04L 5/0007 370/241 |
| 2012/0020229 A1 | 1/2012 | Dayal et al. | |
| 2012/0230239 A1* | 9/2012 | Park | H04W 52/0235 370/311 |
| 2012/0257554 A1* | 10/2012 | Kim | H04L 5/001 370/280 |
| 2012/0314635 A1* | 12/2012 | Lee et al. | 370/311 |
| 2013/0010720 A1 | 1/2013 | Lohr et al. | |
| 2013/0100925 A1 | 4/2013 | Ahn et al. | |
| 2013/0163543 A1 | 6/2013 | Freda et al. | |
| 2013/0176952 A1* | 7/2013 | Shin | H04L 5/001 370/329 |
| 2013/0237208 A1* | 9/2013 | Vujcic | H04B 7/15507 455/418 |
| 2013/0242818 A1* | 9/2013 | Heo | H04W 72/0413 370/280 |
| 2013/0322378 A1* | 12/2013 | Guan | H04W 72/1289 370/329 |
| 2014/0029565 A1* | 1/2014 | Kim et al. | 370/329 |
| 2014/0064170 A1* | 3/2014 | Seo | H04L 5/001 370/311 |
| 2014/0119253 A1* | 5/2014 | Weng et al. | 370/311 |
| 2016/0014626 A1* | 1/2016 | Yi | H04W 76/10 370/252 |

FOREIGN PATENT DOCUMENTS

| | | |
|---|---|---|
| JP | 2010098494 | 4/2010 |
| JP | 2011211495 | 10/2011 |
| JP | 2011528212 | 11/2011 |
| KR | 10-2010-0009493 | 1/2010 |
| TW | 201112819 | 4/2011 |
| TW | 201204156 | 1/2012 |
| WO | 2012125376 A2 | 9/2012 |
| WO | 2013002690 A1 | 1/2013 |
| WO | 2013024333 | 2/2013 |

OTHER PUBLICATIONS

LTE-Advanced:Overcoming Design Challenges for 4G PHY Architectures, Daren McClearnon, et al., Agilent Technologies presentation, Jun. 2, 2011.

LTE-A Carrier Aggregation Enhancements in Release 11, Eiko Seidel, NOMAR Research Newsletter, Aug. 2012.

International Preliminary Report on Patentability, Application No. PCT/US2014/029780, dated Sep. 24, 2015, 10 pages.

Office Action for Japanese Patent Application No. 2015-560413, dated Sep. 9, 2016, pp. 1-6.

Office Action for Korean Patent Application No. 10-2015-7022883, dated Dec. 18, 2016, pp. 1-9.

Office Action for Chinese Patent Application No. 201480010247.X, dated Jul. 4, 2017, pp. 1-13.

* cited by examiner

SECONDARY COMPONENT CARRIER FUTURE SCHEDULING IN LTE CARRIER AGGREGATION

PRIORITY

This application claims the benefit of priority from U.S. Provisional Patent Application Ser. No. 61/799,967, entitled "Secondary Component Carrier Future Scheduling in LTE Carrier Aggregation" and filed on Mar. 15, 2013, and from U.S. patent application Ser. No. 14/214,516, entitled "Secondary Component Carrier Future Scheduling in LTE Carrier Aggregation" and filed on Mar. 14, 2014, both of which are fully incorporated herein by reference for all purposes to the extent not inconsistent with this application or local law.

BACKGROUND

Field of the Application

The disclosure is directed to wireless communications and, more particularly, to the future scheduling of secondary component carrier(s) during carrier aggregation in LTE wireless communications.

Background of the Disclosure

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems and Orthogonal Frequency Division Multiple Access (OFDMA) systems.

Generally, a wireless multiple-access communication system can simultaneously support communication for multiple wireless devices or terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), single-in-multiple-out (SIMO), multiple-in-signal-out (MISO), or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In an FDD system, the transmitting and receiving channels are separated with a guard band (some amount of spectrum that acts as a buffer or insulator), which allows two-way data transmission by, in effect, opening two distinct radio links. In a TDD system, only one channel is used for transmitting and receiving, separating them by different time slots. No guard band is used. This can increase spectral efficiency by eliminating the buffer band and can also increase flexibility in asynchronous applications. For example, if less traffic travels in the uplink, the time slice for that direction can be reduced, and reallocated to downlink traffic.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like numerals within this application.

Various techniques described herein can be used for various wireless communication systems, such as Code Division Multiple Access ("CDMA") systems, Multiple-Carrier CDMA ("MCCDMA"), Wideband CDMA ("W-

CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("WiFi"), IEEE 802.16 "(WiMAX"), IEEE 802.20 ("MBWA"), Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (1×RTT, 1×EV-DO RelO, RevA, RevB) technology and other technologies, such as WiFi, WiMAX, WMBA and the like.

This disclosure makes reference to various wireless communication devices, such as access point, mobile device, base station, user equipment, Node B, access terminal and eNB. The use of these and other names is not intended to indicate or mandate one particular device, one particular standard or protocol, or one particular signaling direction and is expressly intended to not be limiting of the scope of this application in any way. The use of these and other names is strictly for convenience and such names may be interchanged within this application without any loss of coverage or rights.

Figure 1:
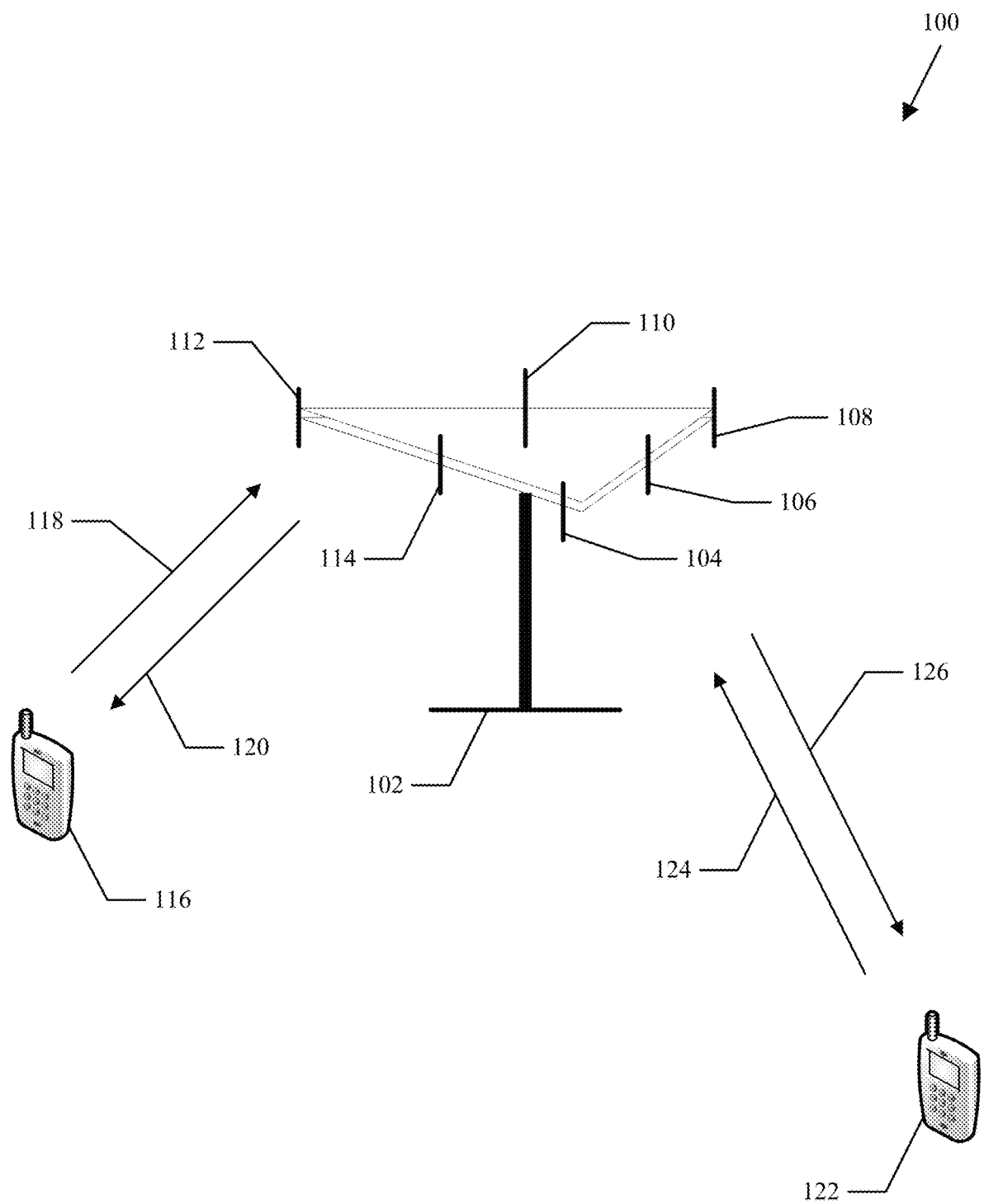
FIG. 1 illustrates an exemplary wireless multiple-access communication system according to certain embodiments.

Referring now to the drawings, FIG. 1 illustrates an exemplary wireless multiple-access communication system 100 according to certain embodiments. In one example, an enhanced Node B (eNB) base station 102 includes multiple antenna groups. As shown in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from UE 122 over uplink 124. In a frequency division duplex (FDD) system, communication links 118, 120, 124 and 126 can use different frequency for communication. In time division duplex (TDD) systems, the communication links can use the same frequency for communication, but at differing times.

Each group of antennas and/or the area in which they are designed to communicate can be referred to as a sector of the eNB or base station. In accordance with one aspect, antenna groups can be designed to communicate to mobile devices in a sector of areas covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage causes less interference to mobile devices in neighboring cells than a base station transmitting through a single antenna to all its UEs. In addition to beamforming, the antenna groups can use other multi-antenna or antenna diversity techniques, such as spatial multiplexing, spatial diversity, pattern diversity, polarization diversity, transmit/receive diversity, adaptive arrays, and the like.

Figure 2:
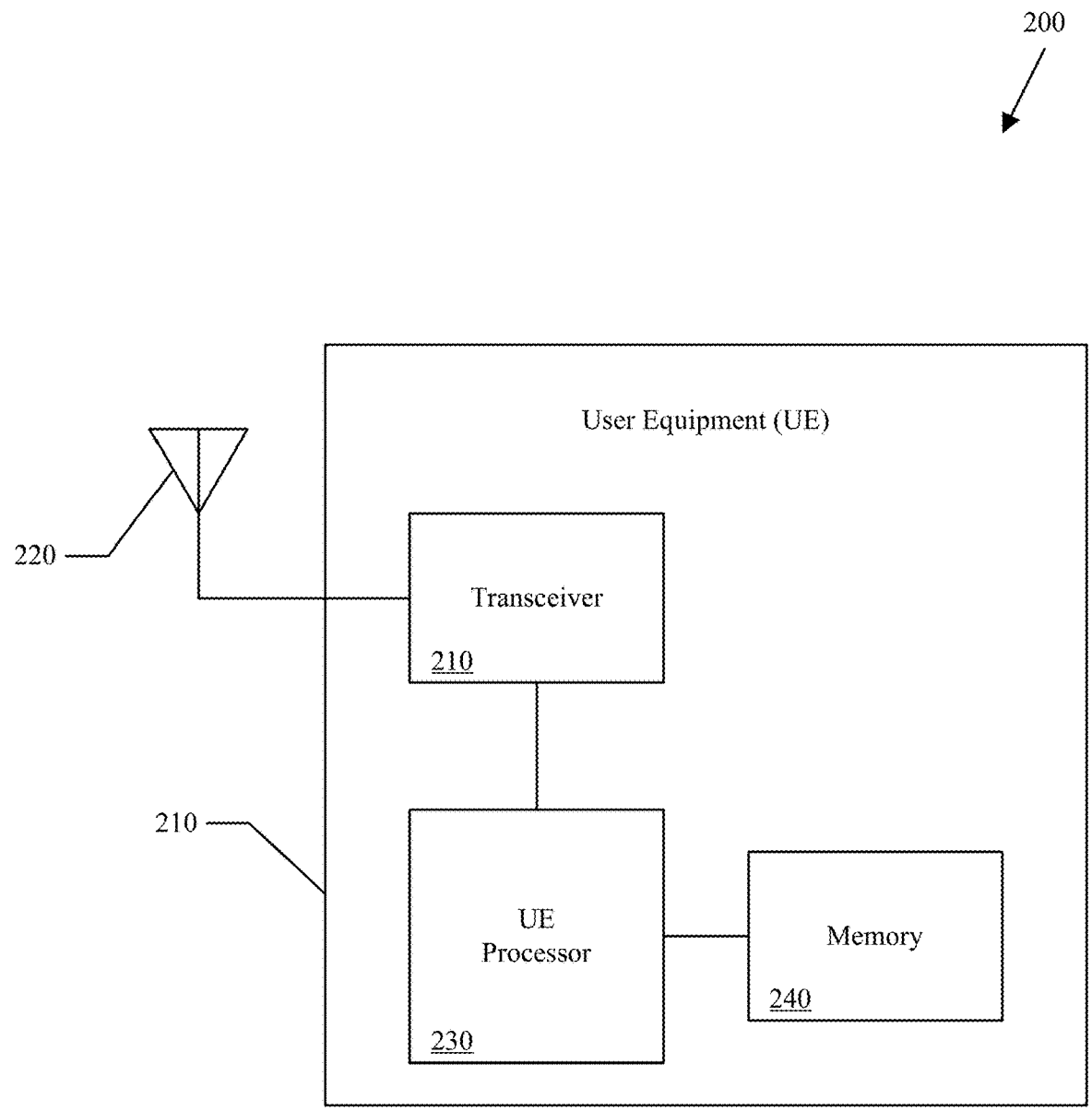
FIG. 2 illustrates a block diagram of an exemplary mobile device or user equipment (UE) according to certain embodiments.

FIG. 2 illustrates a block diagram 200 of an exemplary mobile device or user equipment (UE) 210 according to certain embodiments. As shown in FIG. 2, UE 210 may include a transceiver 210, an antenna 220, a processor 230, and a memory 240 (which, in certain embodiments, may include memory in a Subscriber Identity Module (SIM) card). In certain embodiments, some or all of the functionalities described herein as being performed by mobile communication devices may be provided by processor 230 executing instructions stored on a computer-readable medium, such as the memory 240, as shown in FIG. 2. Additionally, UE 210 may perform uplink and/or downlink communication functions, as further disclosed herein, via transceiver 210 and antenna 220. While only one antenna is shown for UE 210, certain embodiments are equally applicable to multi-antenna mobile devices. In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application.

Figure 3:
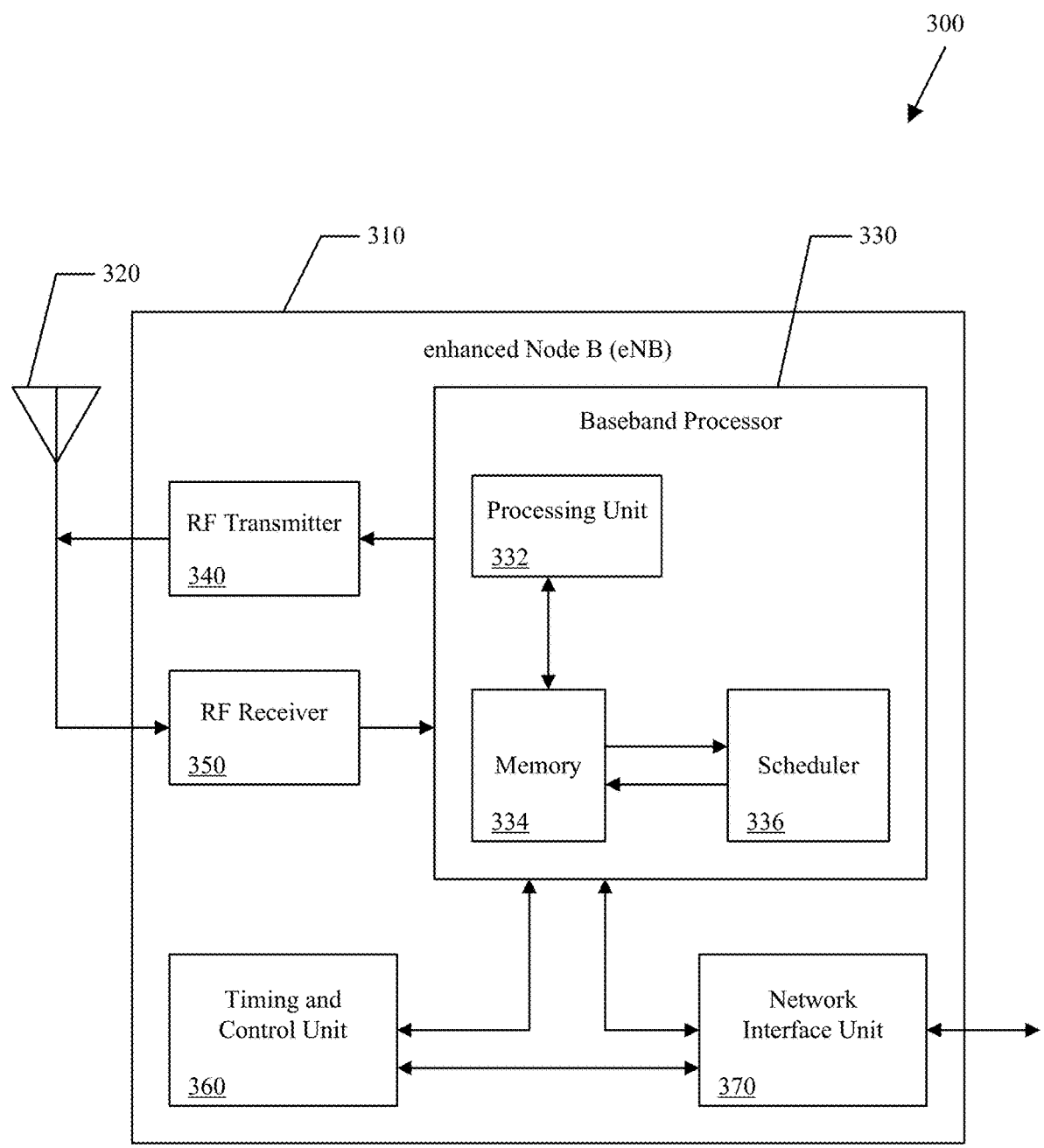
FIG. 3 illustrates a block diagram of an exemplary enhanced Node B (eNB) or similar mobile communication node (e.g., base station, access point, etc.) according to certain embodiments.

FIG. 3 illustrates a block diagram 300 of an exemplary enhanced Node B (eNB) 310 or similar mobile communication node (e.g., base station, access point, etc.) according to certain embodiments. As shown in FIG. 3, eNB 310 may include a baseband processor 330 to provide radio communication with mobile handsets via a radio frequency (RF) transmitter 340 and RF receiver 350 units coupled to the eNB antenna 320. While only one antenna is shown, certain embodiments are applicable to multi-antenna configurations. RF transmitter 340 and RF receiver 350 may be combined into one, transceiver unit, or duplicated to facilitate multiple antenna connections. Baseband processor 330 may be configured (in hardware and/or software) to function according to a wireless communications standard, such as 3GPP LTE. Baseband processor 330 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler in an eNB in an LTE system.

Baseband processor 330 may also provide additional baseband signal processing (e.g., mobile device registration, channel signal information transmission, radio resource management, etc.) as required. Processing unit 332 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described herein as being provided by a mobile base station, a base station controller, a node B, an enhanced node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative and call-management functions for mobile subscribers operating in the network through eNB 310.

Certain embodiments of the base station 310 may include additional components responsible for providing additional functionality, including any of the functionality identified herein and/or any functionality necessary to support the solution described herein. Although features and elements are described in particular combinations, each feature or element can be used alone without the other features and elements or in various combinations with or without one or more features and elements. Methodologies provided herein may be implemented in a computer program, software, or firmware incorporated in a computer-readable storage medium (e.g., memory 334 in FIG. 3) for execution by a general purpose computer or a processor (e. g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on.

Currently, LTE is deployed in various forms around the world. Most initial deployments of LTE are based on Release 8 (R8) of the LTE standards, which initially were frozen in late 2008. Further enhancements, modifications and additions to the LTE standards are continuing to be proposed and implemented. For example, Release 9 (R9) LTE standards were initially frozen in late 2009 and Release 10 (R10), or LTE-Advanced, standards were initially frozen in early 2011. One driving force from R8/R9 towards LTE-Advanced, or R10, was to provide higher bitrates in a cost efficient manner and, at the same time, to fulfill the "4G" requirements as defined by the International Telecommunications Union (ITU). However, these improvements were subject to maintaining backward compatibilities with R8 and R9.

In LTE-Advanced, there are at least several features that help to provide for higher capacity, such as an increased peak data rate for the downlink (DL) of 3 gigabits per second (Gbps), increased peak data rate for the uplink (UL) of 1.5 Gbps, higher spectral efficiency (e.g., from a maximum of 16 bits per second (bps)/Hz in R8 up to 30 bps/Hz in R10), increased number of simultaneously active subscribers, and improved performance at cell edges (e.g., for DL 2×2 MIMO, at least 2.40 bps/Hz/cell). To help facilitate at least some of these improvements, at least a few of the new functionalities introduced in R10 are: carrier aggregation (CA), enhanced use of multi-antenna techniques and support for relay nodes (RN).

In LTE R10 carrier aggregation (CA), the transmission and/or reception bandwidth can be extended through aggregation of multiple component carriers (CCs) between the eNB (base station, access point, etc.) and one or more UEs (wireless devices, mobile devices, handsets, etc.). Each CC is backward compatible with the R8 carrier structure. Carrier Aggregation supports both contiguous and non-contiguous spectrums, including non-contiguous spectrum within the same frequency band (intra-band CA) and non-contiguous spectrum in different frequency bands (inter-band CA). Carrier aggregation in R10 consists of primary and secondary CCs (PCC and SCC, respectively). However, future LTE standards may facilitate multiple SCCs, which will be applicable to the teachings of this disclosure as well. The PCC generally contains CA control information; so the UE can listen to each PCC for that control information.

As previously noted, carrier aggregation can be used in LTE-Advanced to increase the bandwidth, and thereby increase the bitrates. Since R10 tries to keep backward compatibility with R8/R9 mobile devices, the aggregation is of R8/R9 carriers. Carrier aggregation can be used for both frequency-division duplexing (FDD) and time-division duplexing (TDD) operating modes.

Figure 4:
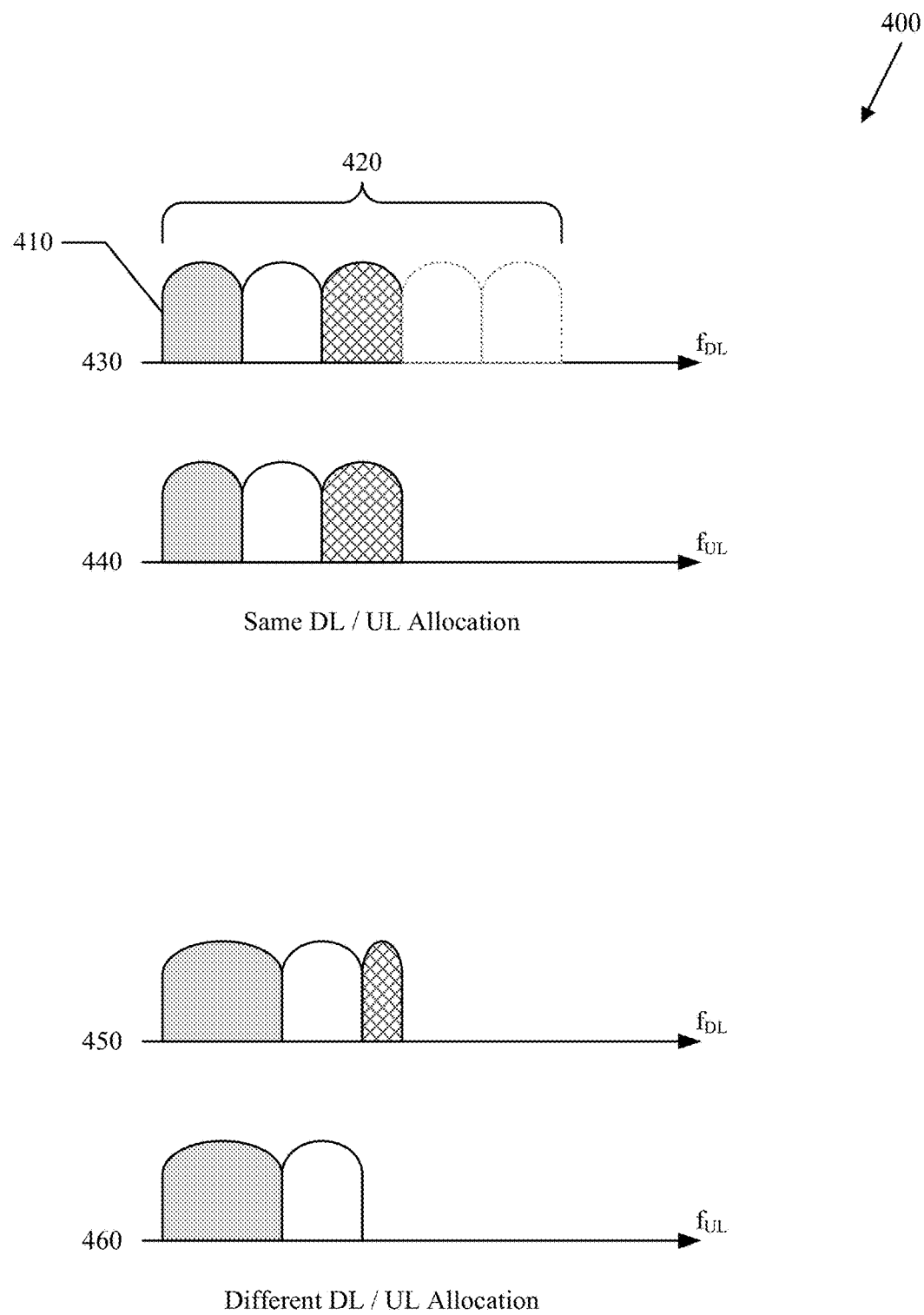
FIG. 4 illustrates exemplary carrier aggregation in LTE FDD according to certain embodiments.

FIG. 4 illustrates exemplary carrier aggregation 400 in LTE FDD according to certain embodiments. As shown in FIG. 4, the R10 UE can be allocated DL and UL resources on the aggregated resource, the R8/R9 UEs can be allocated resources on any one of the component carriers 410 (CCs). CCs 410 can be of the same or different bandwidths, and the allocation DL and UL can be the same or different. Each aggregated carrier is referred to as a component carrier (CC) 410. In R10, component carrier 410 can have a bandwidth of 1.4, 3, 5, 10, 15 or 20 MHz and a maximum of five component carriers 420 can be aggregated. Hence, the maximum aggregated bandwidth is 100 MHz (i.e. up to five 20 MHz CCs). In LTE FDD the number of aggregated carriers can be different in DL 450 and UL 460 (as illustrated in FIG. 4). However, the number of UL 460 component carriers is always equal to or lower than the number of DL component carriers. The individual component carriers can also be of different bandwidths. When LTE TDD is used, the number of CCs and the bandwidth of each CC are the same for DL 430 and UL 440.

Figure 5:
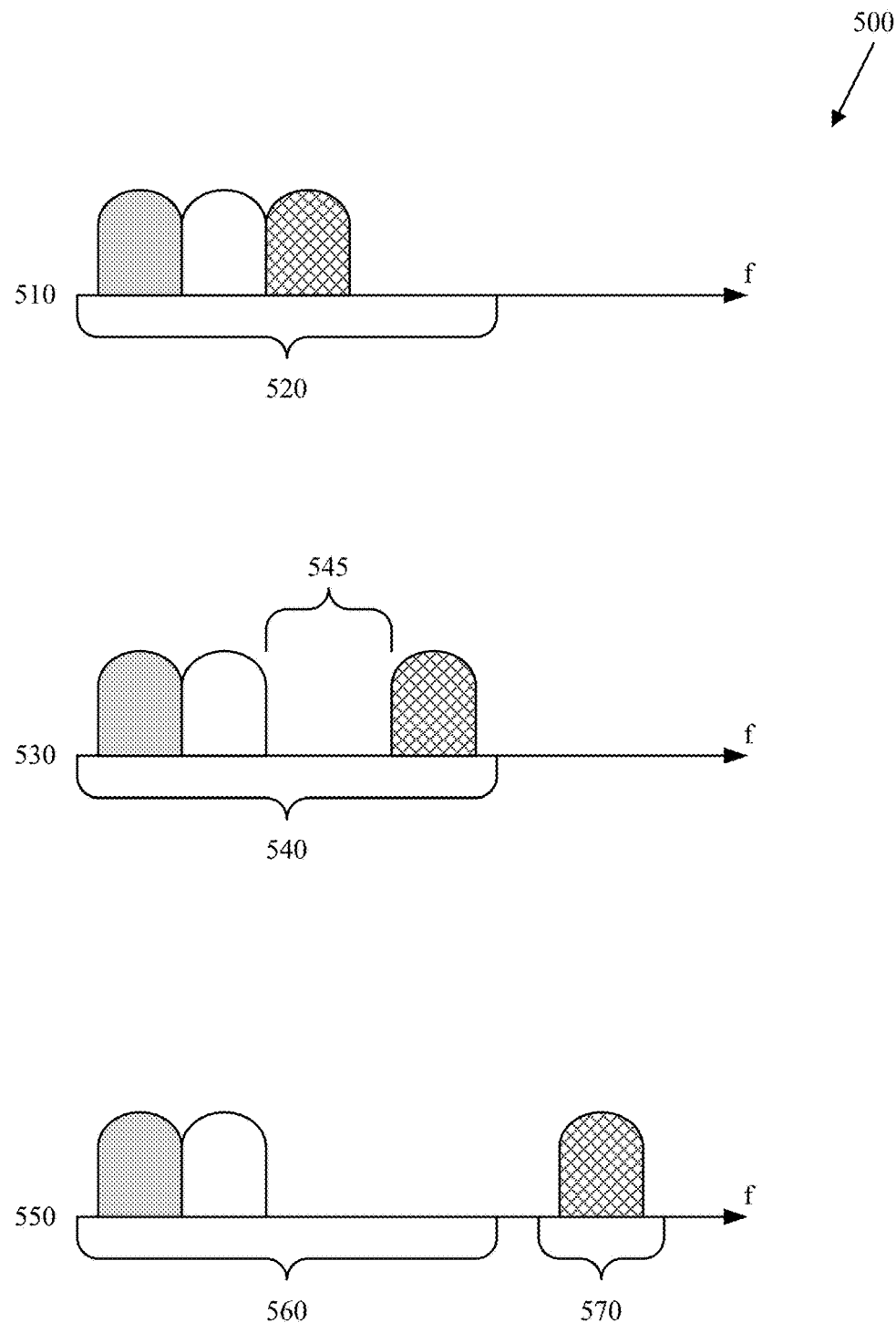
FIG. 5 illustrates exemplary carrier aggregation alternatives according to certain embodiments.

FIG. 5 illustrates exemplary carrier aggregation alternatives 500 according to certain embodiments. As shown in FIG. 5, three alternatives are possible: intra-band contiguous CA (or simply, contiguous CA) 510, intra-band non-contiguous CA 530 or inter-band non-contiguous CA (or simply inter-band CA) 550. The least complicated way to arrange aggregation among these three alternatives can be to use contiguous component carriers within the same, one operating frequency band 520 (as defined for LTE), or so called intra-band contiguous CA 510. However, this might not always be possible, depending on frequency allocation scenarios. Therefore, for non-contiguous allocations there are two possibilities, intra-band 530 and inter-band 550. For intra-band, the component carriers belong to the same operating frequency band 540, but have one or more gaps 545 between them. Generally, in CA, the spacing between two CCs can be N*300 kHz, where N is some integer. For inter-band, the component carriers belong to one or more different operating frequency bands 560, 570. Additionally, for non-contiguous alternatives, the CCs can be separated by one or more frequency gaps.

For practical reasons, CA is initially specified by LTE standards for a few operating bands. In R10, three CA bands are defined. However, future expansions of the CA operating bands are intended to be applicable to the disclosure and claims of this application. For intra-band contiguous CA, R8 operating band 1 (FDD) is defined as CA band CA_1 and band 40 (TDD) are defined as CA_40. For inter-band non-contiguous CA, R8 operating bands 1 and 5 (FDD) are defined as one CA band named CA_1-5.

When carrier aggregation is used there are a number of serving cells, one for each component carrier. The coverage of the serving cells may differ—both due to component carrier frequencies and from power planning—which can be useful for heterogeneous network planning. The radio resource control (RRC) connection is handled by one cell, the primary serving cell, served by the primary component carrier (DL and UL PCC). It is also on the DL PCC that the UE can receive non-access stratum (NAS) information, such as security parameters. In idle mode the UE listens to system information on the DL PCC. On the UL PCC, PUCCH (physical uplink control channel) is sent. The other component carriers are all referred to as secondary component carriers (DL and UL SCC), serving secondary serving cells.

Figure 6:
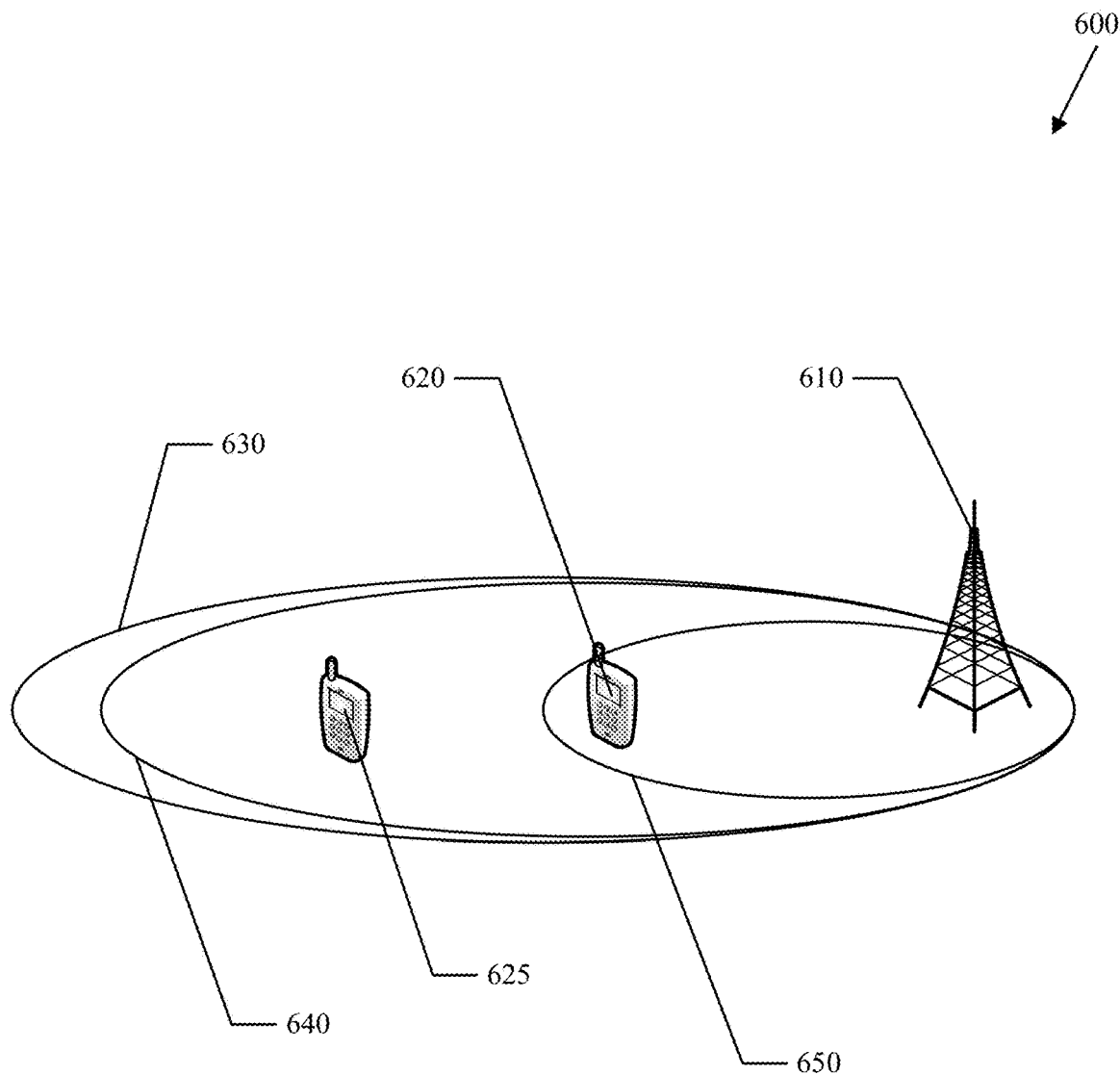
FIG. 6 illustrates exemplary primary and secondary serving cells according to certain embodiments.

FIG. 6 illustrates exemplary primary and secondary serving cells 600 according to certain embodiments. As shown in FIG. 6, three different coverage cells can each have a corresponding component carrier. For example, outer cell 630 can be the primary serving cell and have the primary component carrier, which might include the RRC connection and data. A middle cell 640 can be a secondary serving cell and have a secondary component carrier. An inner cell 650 can be a secondary serving cell and have a secondary component carrier (both of which can be different than the SSC and SCC of middle cell 640). The different serving cells may or may not have different coverage areas (as illustrated, they are all different), which may be useful for heterogeneous cell-planning. The SCCs can be added and removed as required by a UE (e.g., when additional bandwidth may be necessary and/or as network planning permits), while the PCC is only changed at handover. Different component carriers can be planned to provide different coverage, i.e. different cell size. In the case of inter-band carrier aggregation, the component carriers can experience different path losses and/or interferences, which can increase with increasing frequency. As shown in FIG. 6, carrier aggregation on all three component carriers can only be used for the UE 620 (the one closest to eNB 610), while UE 625 (the one farthest from eNB 610) is not within the coverage area of inner cell 650. Note that UEs using the same set or subset of CCs can have different PCCs.

The R10 introduction of carrier aggregation influences mainly the media access control (MAC) and the physical layer protocols, but does include some new RRC messages. In order to keep R8 and R9 backwards compatibility, each component carrier is treated as an R8 carrier (in a general sense). However some new information is necessary, such as new RRC messages, in order to handle SCC (i.e., the addition, removal and reconfiguration of SCCs), and MAC should be able to handle scheduling of on a number of CCs and HARQ on a per-CC and/or multiple-CC basis. Changes on the physical layer are, for example, physical downlink control channel (PDCCH), ACK/NACK and CSI need to be handled on a per-CC and/or multiple-CC basis. Also, the physical can include signaling information about scheduling on CCs.

Figure 7:
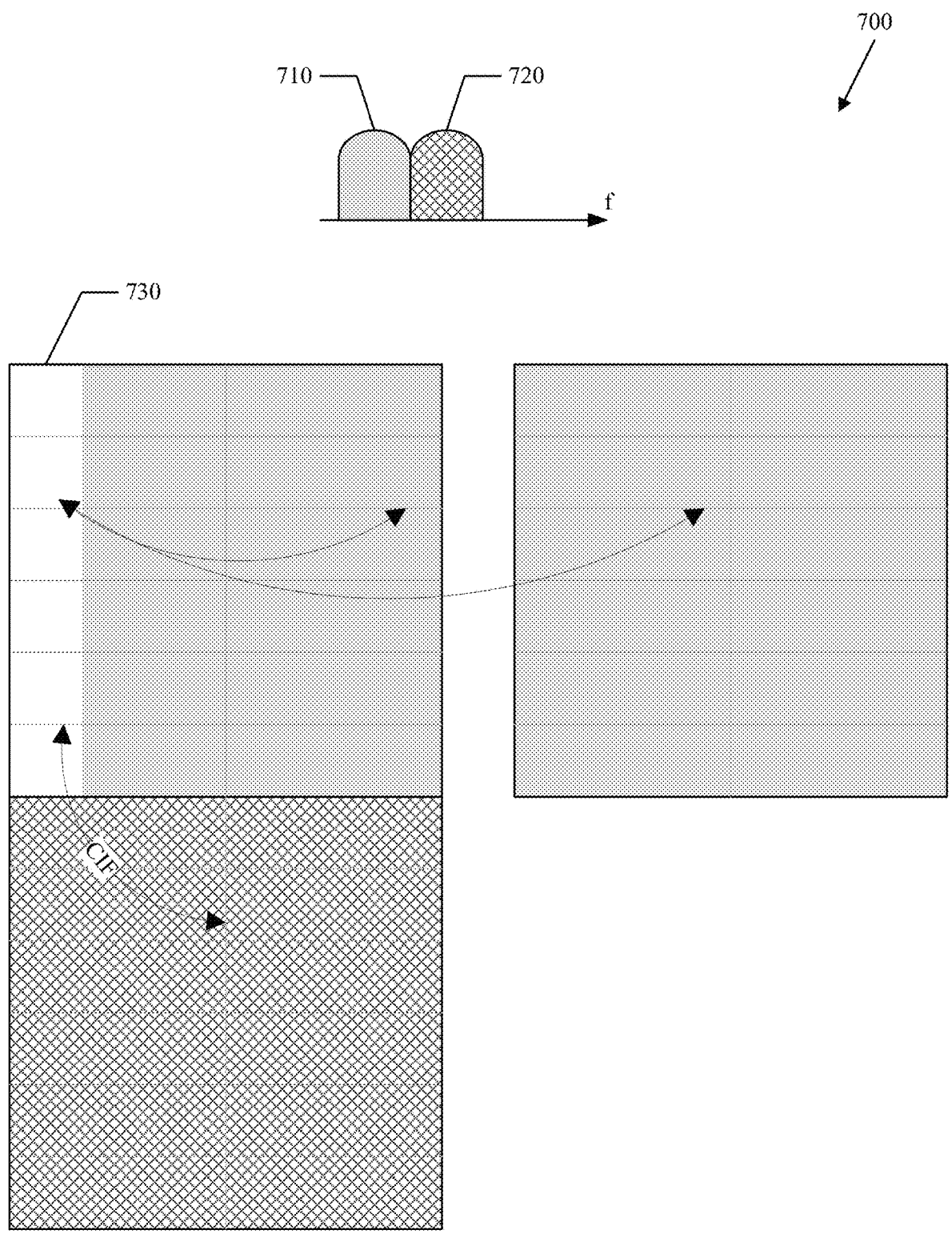
FIG. 7 illustrates LTE FDD CA scheduling according to certain embodiments.

Regarding scheduling, there are two main alternatives for R10 CA, either resources are scheduled on the same carrier as the grant is received or so called cross-carrier scheduling may be used, both of which are forward-looking CA scheduling techniques. FIG. 7 illustrates LTE FDD CA scheduling according to certain embodiments. As shown in FIG. 7, cross-carrier scheduling 700 is used to schedule resources on SCC(s) without physical downlink control channel (PDCCH). In cross-carrier scheduling, PDCCH (scheduling information) can be transmitted on the PCC. The scheduling information will be for both PCC and SCCs. PDSCH (user data) can be on PCC and SCCs, as needed. For example, consider the situation with PCC 710 and one SCC 720. PCC 710 can include PDCCH 730 (e.g., the white are of PCC). The carrier indicator field (CIF) on PDCCH 730 can indicate on which carrier the scheduled resource(s) is/(are) located. As shown, PDCCH 730 indicates three carriers for the scheduling resources, one of which is within SCC 720 (i.e., so that the scheduling grant and the resources are not on the same carrier).

Figure 8:
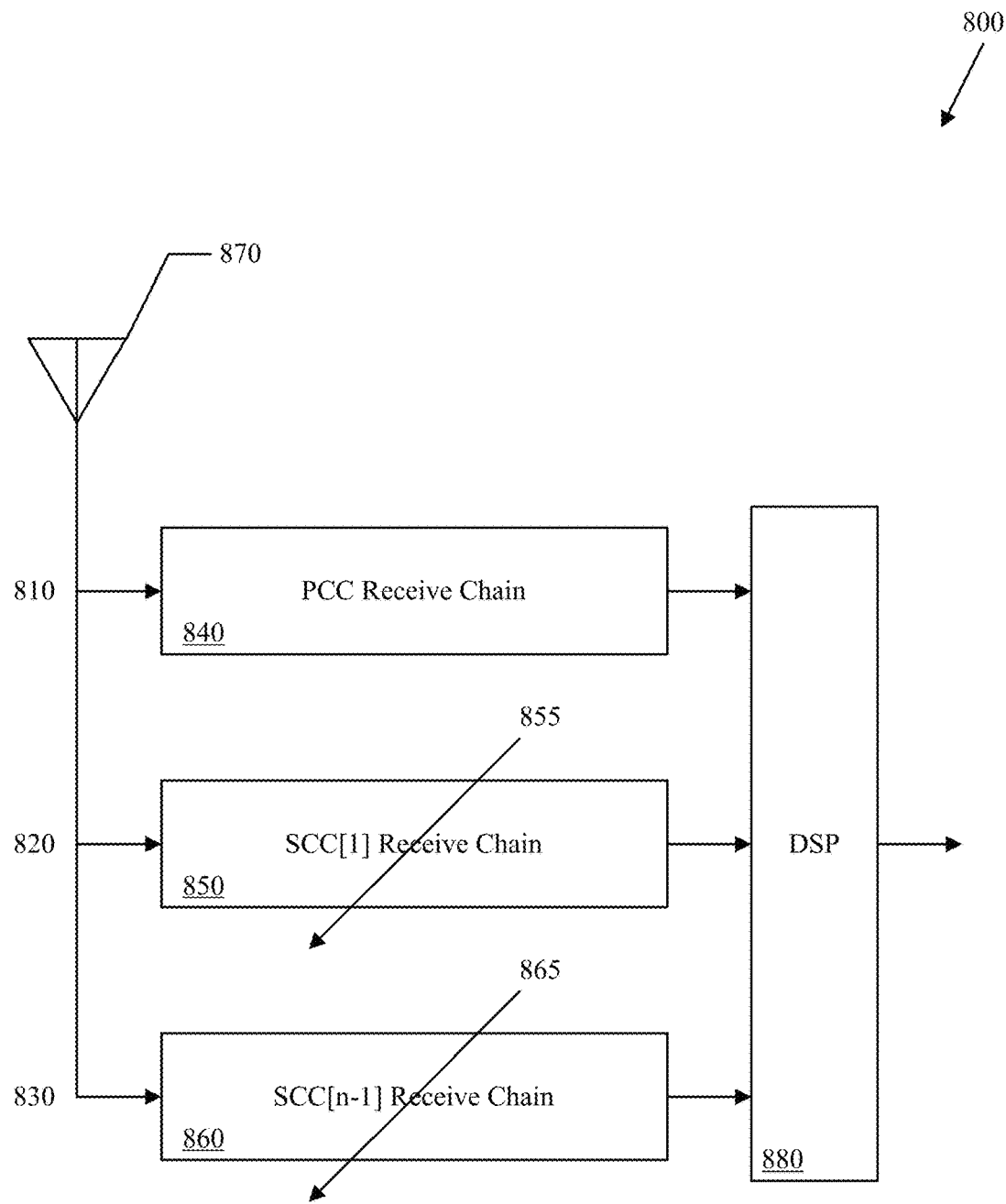
FIG. 8 illustrates exemplary transceiver architecture using cross-carrier scheduling according to certain embodiments.

FIG. 8 illustrates exemplary transceiver architecture 800 using cross-carrier scheduling according to certain embodiments. As shown in FIG. 8, each component carrier (CC) 810, 820, 830 can have a separate RF receive chain 840, 850, 860 and share an antenna 870. Alternatively, certain components of each CC receive chain may be combined and/or shared with other CC receive chains. Likewise, one or more CC receive chain may have a separate antenna from the remaining CC receive chains. In FIG. 8, a primary component carrier (PCC) and each secondary component carrier (SCC) have separate RF receive chains 840, 850, 860. Each SCC receive chain (and, alternatively, the PCC receive chain) can have the ability to be selectively turned on or off (i.e., powered up or down) 855, 865 from each of the remaining PCC/SCC receive chains. Each SCC RF receive chains 840, 850, 860 may include components/functions of RF band-pass filter (per CC), RF frontend and analog-to-digital converter (not shown). The receive chains illustrated in FIG. 8 may be implemented, for example, as transceiver 210 as shown in FIG. 2. The antenna illustrated in FIG. 10 may be implemented as antenna 220 as shown in FIG. 2. The digital signal processor (DSP) in FIG. 10 may be implemented as at least part of UE processor 230 as shown in FIG. 2.

In certain embodiments, the UE may be receiving multiple component carriers even though it may not be allocated data on the secondary component carriers (SCCs). This can waste power, as the UE's receiving circuitry is powered on to receive the SCCs even though no data are scheduled for the UE on the SCCs. Currently in the R10, the network (NW) e.g., via the eNB, can activate/deactivate CA through MAC messaging. However, the MAC messaging time-frame may be too slow, and not closely follow the dynamic scheduling (i.e., and not deactivate before receiving SCCs with no data). Moreover, this type of CA MAC messaging is only an implicit indication of data transfer; that is, implementation variations of activate/deactivate usage may not tightly follow traffic patterns and may preclude efficient use of deactivate, thus harming potential UE CA power savings.

Therefore, certain embodiments can introduce a new LTE message, for example, in PDCCH and/or as a MAC control element (CE) that can inform the UE whether data are scheduled for future SCC subframes or subframes on multiple SCCs. This can enable the UE to anticipate or know whether data will arrive on the SCC (or one or more SCCs) in a particular subframe or subframes, and choose to shut down the SCC receive circuitry for that SCC (or those SCCs) when no data are expected.

Figure 9:
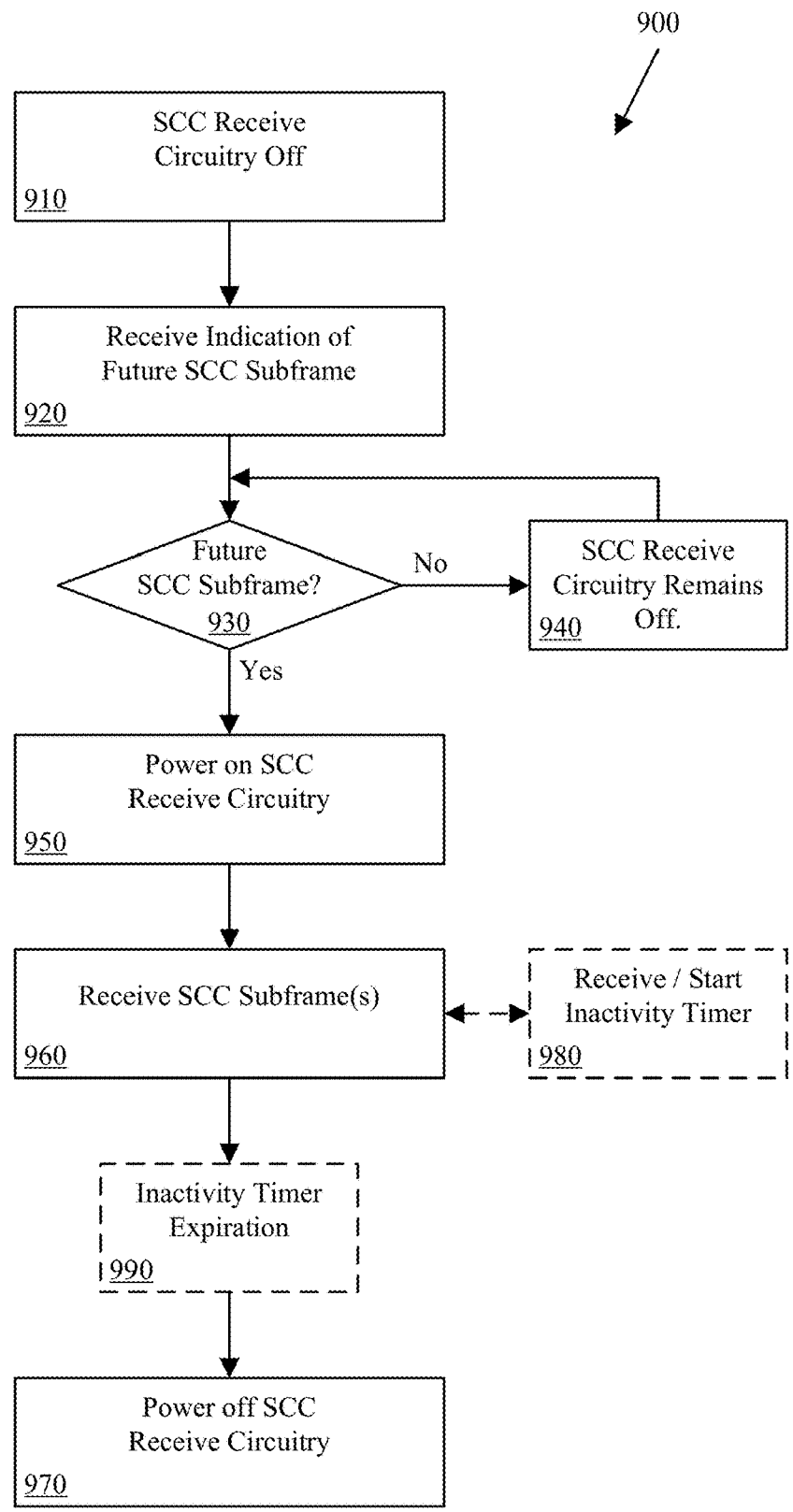
FIG. 9 illustrates an exemplary timeline showing future scheduling of secondary component carrier(s) according to certain embodiments.

FIG. 9 illustrates an exemplary flow diagram 900 for future scheduling of secondary component carrier(s) according to certain embodiments. As shown in FIG. 9 (with reference to the timelines of FIGS. 10-12), flow diagram 900 begins with the SCC receive circuitry off 910. Next, the receiver receives a subframe that includes an indicator of a future subframe that includes SCC information for the receiver 920 (i.e., for which the receiver will need to turn on the SCC receive circuitry to receive). Since the SCC receive circuitry is off, the reception at 920 can use PCC receive circuitry. Alternatively, steps 910 and 920 might be performed in reverse order, such that the receiver receives the future SCC subframe indication first, and then knowing that the SCC receive circuitry will not be needed for some time (or number of subframes), it will turn off the SCC receive circuitry.

Next, at 930, the receiver decides whether it is receiving (or is about to receive) the future SCC subframe. If not at the future SCC subframe, then the SCC receive circuitry remains off 940 and the receiver can continue receiving, but without using the SCC receive circuitry (i.e., with PCC). However if the receiver is at (or about to be at) the future SCC subframe, then the receiver can power on the SCC receive circuitry 950. Optionally, at 955, the receiver may also start an inactivity timer. The receiver is now ready to receive, or at least attempt to receive, any/all SCC subframe(s) 960 (of which, there may be none, i.e., a "false alarm" of sorts). Optionally, at 980, the receiver may also receive set-up information/data regarding an inactivity timer and/or start the inactivity timer. The inactivity timer may also be an inherent part of the receiver and may not need to be set-up. The inactivity timer may be used to indicate how long (in time, number of subframes, etc.) the SCC receiver circuitry remains powered on after the "power-on" SCC subframe. Of course, the receiver might receive the set-up information/data regarding an inactivity timer at an earlier point, for example at 920. After any/all SCC subframe(s) are received (and/or optionally, after the expiration of the inactivity timer 990), the receiver can once again power off the SCC receive circuitry 970. As previously mentioned, instead of turning off the SCC receive circuitry at 970, the receiver can wait until after receiving the next indication of the next future SCC subframe 920, which might be included when receiving SCC subframes 960.

Figure 10:
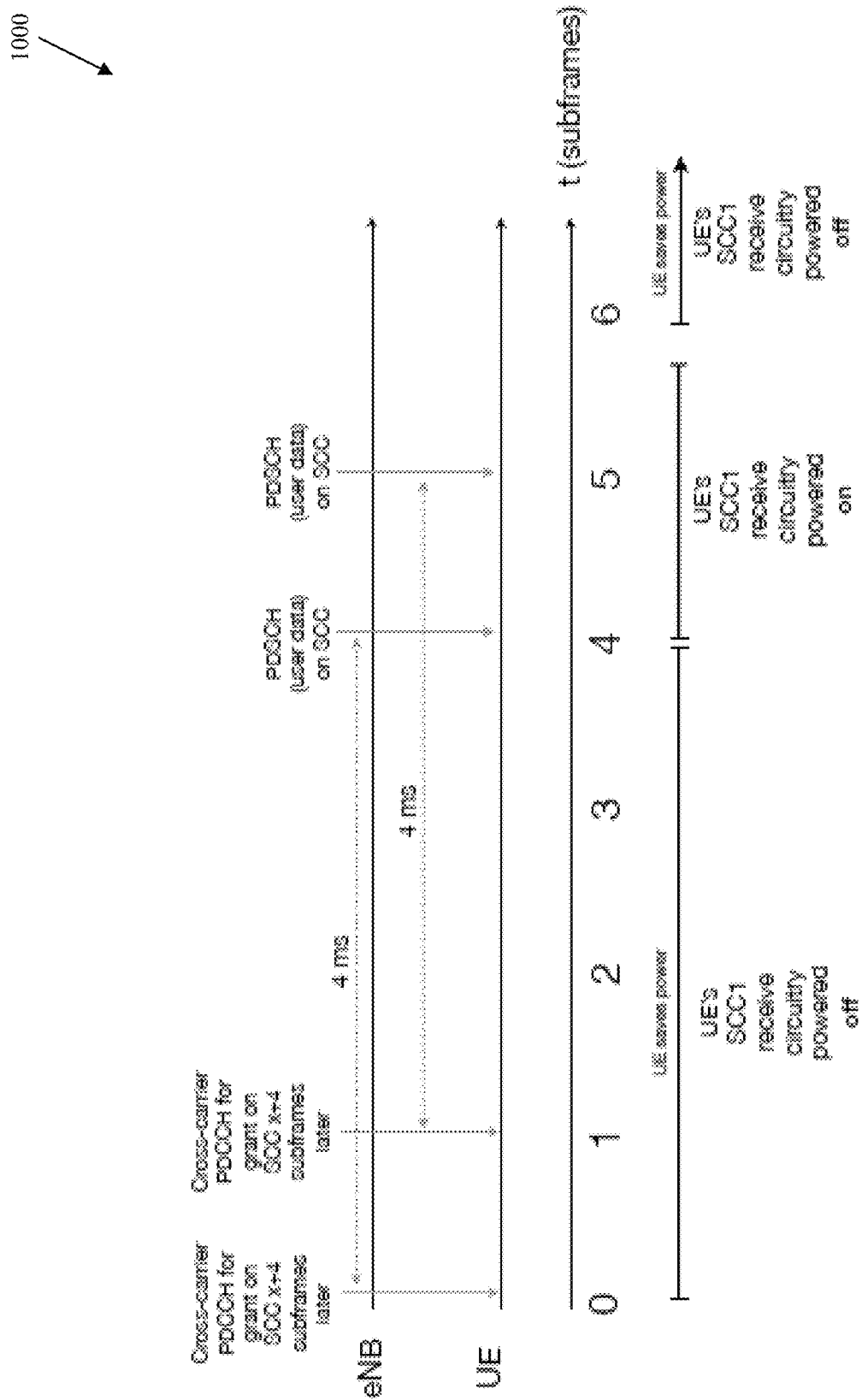
FIG. 10 illustrates an exemplary flow diagram for future scheduling of secondary component carrier(s) according to certain embodiments.

FIG. 10 illustrates an exemplary timeline 1000 showing future scheduling of secondary component carrier(s) according to certain embodiments. As shown in FIG. 10, at subframe 0 the UE receives PDCCH SCC grant allocation(s) (i.e., on PCC), which can indicate the location and time in the future when an SCC is scheduled for data. For example, the UE could receive an SCC schedule that is advanced by "X" subframes (i.e., 4 ms in this example). The SCC receive chains can be powered off when receiving this PDCCH SCC grant allocation message, and after receiving it, the UE knows it can leave the SCC receive chain(s) off until it needs to receive the subframe(s) containing the SCC data (i.e., subframe 4 in this example). As and when needed, the UE can power on the required SCC receive chains and leave them on until the SCC data are received, after which the UE can again power off the SCC receive chains until it receives a new PDCCH SCC grant allocation message with a new time and/or subframe and/or other indicator for receiving SCC data.

Figure 11:
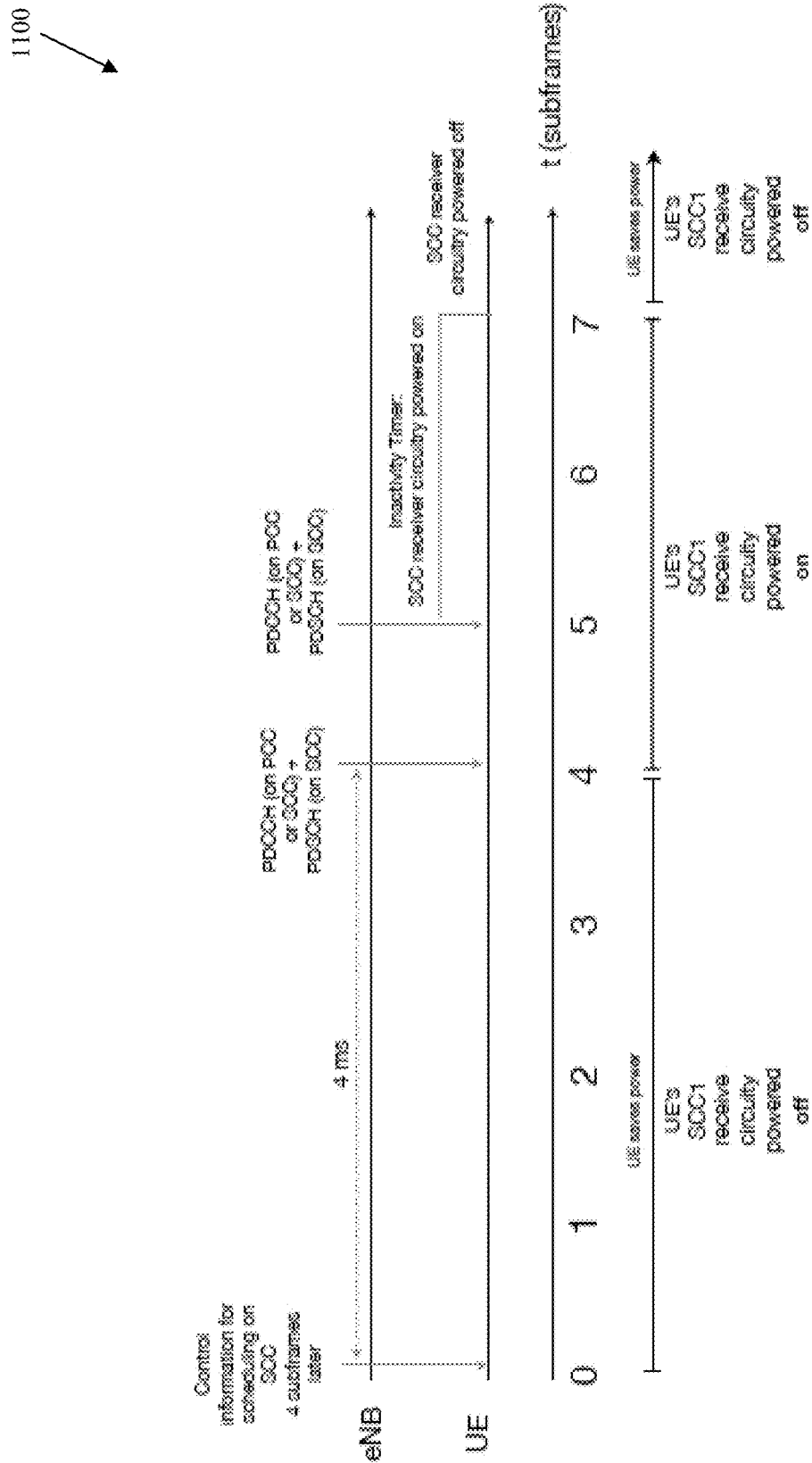
FIG. 11 illustrates an exemplary timeline showing future scheduling of secondary component carrier(s) according to certain embodiments.

FIG. 11 illustrates an exemplary timeline 1100 showing future scheduling of secondary component carrier(s) according to certain embodiments. In certain embodiments, the PDCCH includes an additional informational element indicating future scheduling on SCCs. Alternatively, as shown in FIG. 11, rather than modifying the PDCCH (as in FIG. 10), this information element could be transmitted on a new MAC control element (CE) in PDSCH. As shown, at subframe zero, the SCC receive chains are off, but the UE receives a MAC CE indicating control information for scheduling a wake-up (i.e., or power-on) to receive scheduling on SCC (i.e., in this example, 4 ms later). Then, at the scheduled wake-up subframe, the UE's SCC receive chain(s) can be powered on for receiving PDCCH on PCC or SCC, plus physical data shared channel (PDSCH) on SCC.

SCC reception can include an inactivity timer to dictate how long the UE must continue to listen to PDCCH on SCC after the initial wakeup subframe. The PDCCH indication specifies the subframe where data arrives on the SCC (i.e., beginning of the on-duration). Inactivity timer can be specified in the RRC configuration and/or the MAC control element. Alternatively, the last SCC PDSCH can contain information indicating that the end of DL traffic on this SCC has happened (or is happening), and the UE can power down the SCC receive circuitry. Once the end of the SCC data is received, then the UE can once again power off the SCC receive chain(s). If no end of SCC data is received, then the UE can use an inactivity timer to indicate when to once again power off the SCC receive chains (i.e., in this example, the inactivity timer length is two subframes, but this can vary). The inactivity timer can be initialized at every SCC data reception and counted up (or down, depending on design) for the desired number of subframes (or length of time), at which point the UE can power off the appropriate SCC receive chain(s).

Figure 12:
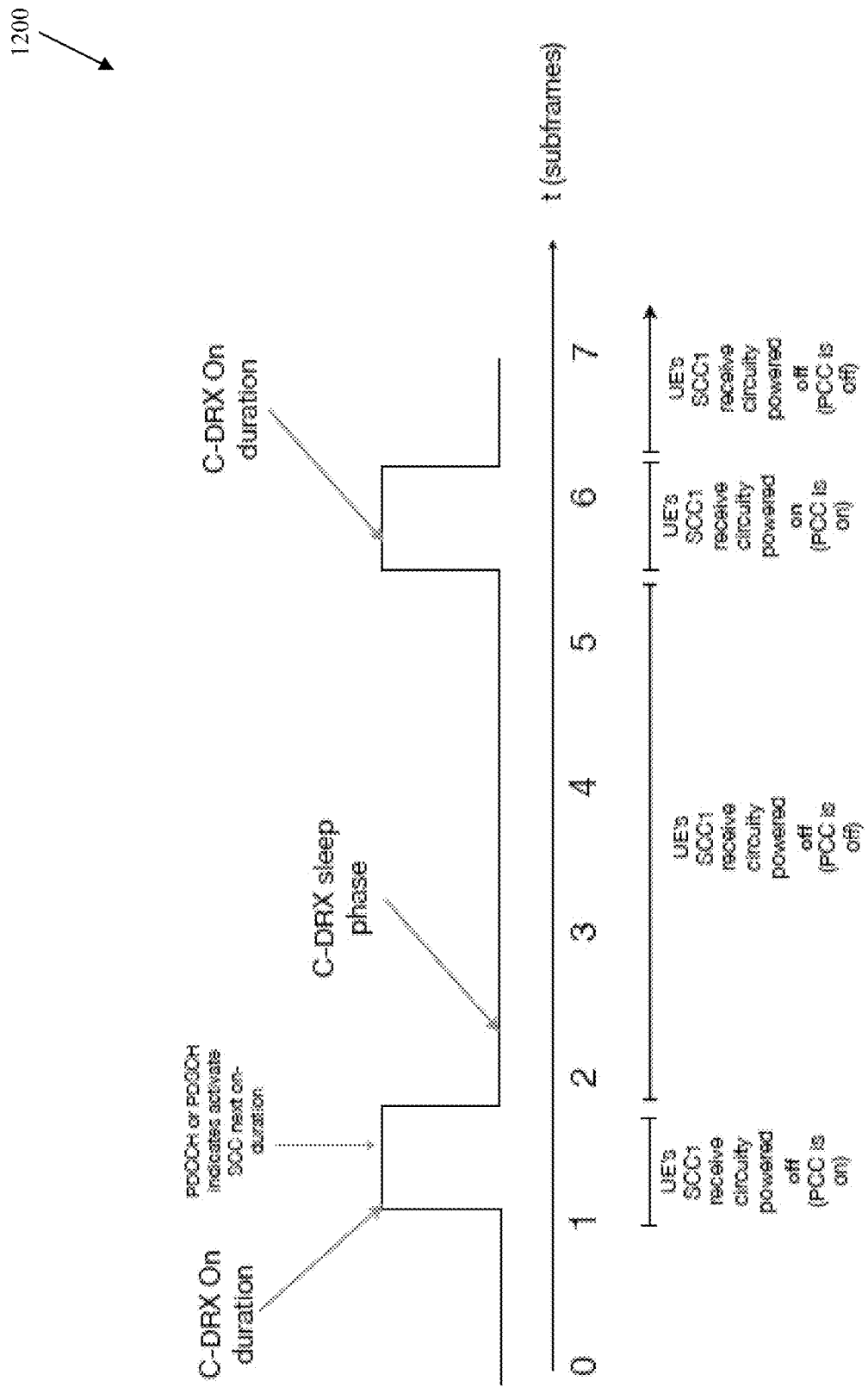
FIG. 12 illustrates an exemplary flow diagram for future scheduling of secondary component carrier(s) according to certain embodiments.

FIG. 12 illustrates an exemplary timeline 1200 showing future scheduling of secondary component carrier(s) according to certain embodiments. As shown in FIG. 12, when the UE is cycling between a connected state and a connected discontinuous reception (C-DRX) state, certain embodiments can be used to power off the SCC receive circuitry when in the C-DRX state. For example, PDCCH and/or PDSCH can include information to activate SCC(s) receive circuitry (or not) during the next C-DRX on duration. When the UE is in C-DRX sleep mode, then the UE can power off the SCC receive chain(s) and not power them on again until the appropriate (as indicated in the PDCCH and/or PDSCH received information) C-DRX on duration (i.e., in this example, the second C-DRX on duration around subframe 6). After this on-duration, if the UE has no SCC data to receive, it can once again power off the SCC receive circuitry and wait until the next instructed on duration to power on and check again.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application, design constraints or preferences imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and elements may be added.

What is claimed is:

1. A method for secondary component carrier (SCC) future scheduling during carrier aggregation in a cellular wireless network, comprising:
at a receiver of a user equipment device (UE), the receiver comprising SCC receive circuitry and primary component carrier (PCC) receive circuitry:
receiving, at a first time, via the PCC receive circuitry, a first subframe including an SCC future scheduling indication, wherein the SCC future scheduling indication specifies a future time that includes scheduled data for SCC reception by the receiver, wherein SCC receive circuitry of the receiver is on at the first time when the first subframe is received;
powering off the SCC receive circuitry in response to the SCC future scheduling indication;
powering on, at a second time, the SCC receive circuitry based at least in part on the SCC future scheduling indication, wherein the second time is after the first time and for the specified future time; and
receiving the scheduled data on an SCC via the SCC receive circuitry.

2. The method of claim 1, wherein receiving the SCC future scheduling indication includes receiving on the PCC.

3. The method of claim 2, wherein receiving the SCC future scheduling indication includes receiving first subframe physical downlink control channel (PDCCH) information, which includes a PDCCH SCC grant allocation message for the SCC data reception.

4. The method of claim 3, wherein the PDCCH SCC grant allocation message includes a number of subframes to be added to a current subframe for calculating the future time.

5. The method of claim 1, further comprising:
powering off the SCC receive circuitry based on at least one of the following conditions:
receiving an end of SCC downlink data on a last SCC PDSCH; and
completing an inactivity timer.

6. An apparatus for secondary component carrier (SCC) future scheduling of a user equipment device (UE) during carrier aggregation in a cellular wireless network, comprising:
SCC receive circuitry;
primary component carrier (PCC) receive circuitry for receiving a first subframe at a first time including an SCC future scheduling indication, wherein the SCC future scheduling indication specifies a future time that includes scheduled data for SCC reception, wherein the SCC receive circuitry is on at the first time when the first subframe is received; and
a processor, coupled to the SCC receive circuitry and the PCC receive circuitry, wherein the processor is configured for:
powering off the SCC receive circuitry in response to the SCC future scheduling indication; and
powering on, at a second time, the SCC receive circuitry based at least in part on the SCC future scheduling indication, wherein the second time is after the first time and for the specified future time, wherein the SCC receive circuitry is configured to receive the scheduled data on an SCC.

7. The apparatus of claim 6, wherein receiving the SCC future scheduling indication includes receiving first subframe physical downlink control channel (PDCCH) information, which includes a PDCCH SCC grant allocation message for the SCC data reception.

8. The apparatus of claim 7, wherein the PDCCH SCC grant allocation message includes a number of subframes to be added to a current subframe for calculating a future subframe corresponding to the future time.

9. The apparatus of claim 6, wherein the processor is further configured for:
powering off the SCC receive circuitry based on at least one of the following conditions:
receiving an end of SCC downlink data on a last SCC physical data shared channel (PDSCH); and
completing an inactivity timer.

10. A non-transitory computer-program storage apparatus for secondary component carrier (SCC) future scheduling, of a user equipment device (UE), during carrier aggregation in a cellular wireless network comprising a memory having one or more software modules stored thereon, the one or more software modules being executable by one or more processors and the one or more software modules comprising:

code for receiving, at a first time, via at least one of SCC receive circuitry or primary component carrier (PCC) receive circuitry, a first subframe including an SCC future scheduling indication, wherein the SCC future scheduling indication specifies a future time that includes scheduled data for SCC data reception, wherein the SCC receive circuitry is on at the first time when the first subframe is received;

code for powering off the SCC receive circuitry in response the SCC future scheduling indication, wherein the SCC receive circuitry is on at the first time when the first subframe is received;

code for powering on the SCC receive circuitry at a second time based at least in part on the SCC future scheduling indication, wherein the second time is after the first time and for the specified future time; and code for receiving the scheduled data on SCC via the SCC receive circuitry.

11. The non-transitory computer-program storage apparatus of claim 10, wherein the code for receiving the SCC future scheduling indication includes code for receiving on the PCC via the PCC receive circuitry.

12. The non-transitory computer-program storage apparatus of claim 11, wherein the code for receiving the SCC future scheduling indication includes code for receiving first subframe physical downlink control channel (PDCCH) information, which includes a PDCCH SCC grant allocation message for the SCC data reception.

13. The method of claim 1, wherein the SCC future scheduling indication comprises a media access control (MAC) control element (CE) which specifies a wake-up subframe for receiving on the SCC, wherein the MAC CE further includes an inactivity timer specification which is configured to initialize an inactivity timer associated with the SCC receive circuitry at wake up of the SCC receive circuitry.

14. The apparatus of claim 6, wherein the SCC future scheduling indication is received in a media access control (MAC) control element (CE), wherein the MAC CE includes a wake-up subframe for receiving on the SCC, wherein the MAC CE further includes an inactivity timer specification which is configured to initialize an inactivity timer associated with the SCC receive circuitry at wake up of the SCC receive circuitry.

15. The non-transitory computer-program storage apparatus of claim 11, wherein the SCC future scheduling indication is received in a media access control (MAC) control element (CE), wherein the MAC CE includes a wake-up subframe for receiving on the SCC, wherein the MAC CE further includes an inactivity timer specification which is configured to initialize an inactivity timer associated with the SCC receive circuitry at wake up of the SCC receive circuitry.

16. The method of claim 1, wherein the SCC receive circuitry comprises a plurality of receive chains.

17. The method of claim 1, wherein the SCC future scheduling indication further specifies that no SCC data is scheduled for the UE prior to the specified future time.

* * * * *